Feb. 2, 1954  F. S. DICKINSON, JR  2,667,874
MEDICAMENT CARTRIDGE ASSEMBLY
Filed July 9, 1951
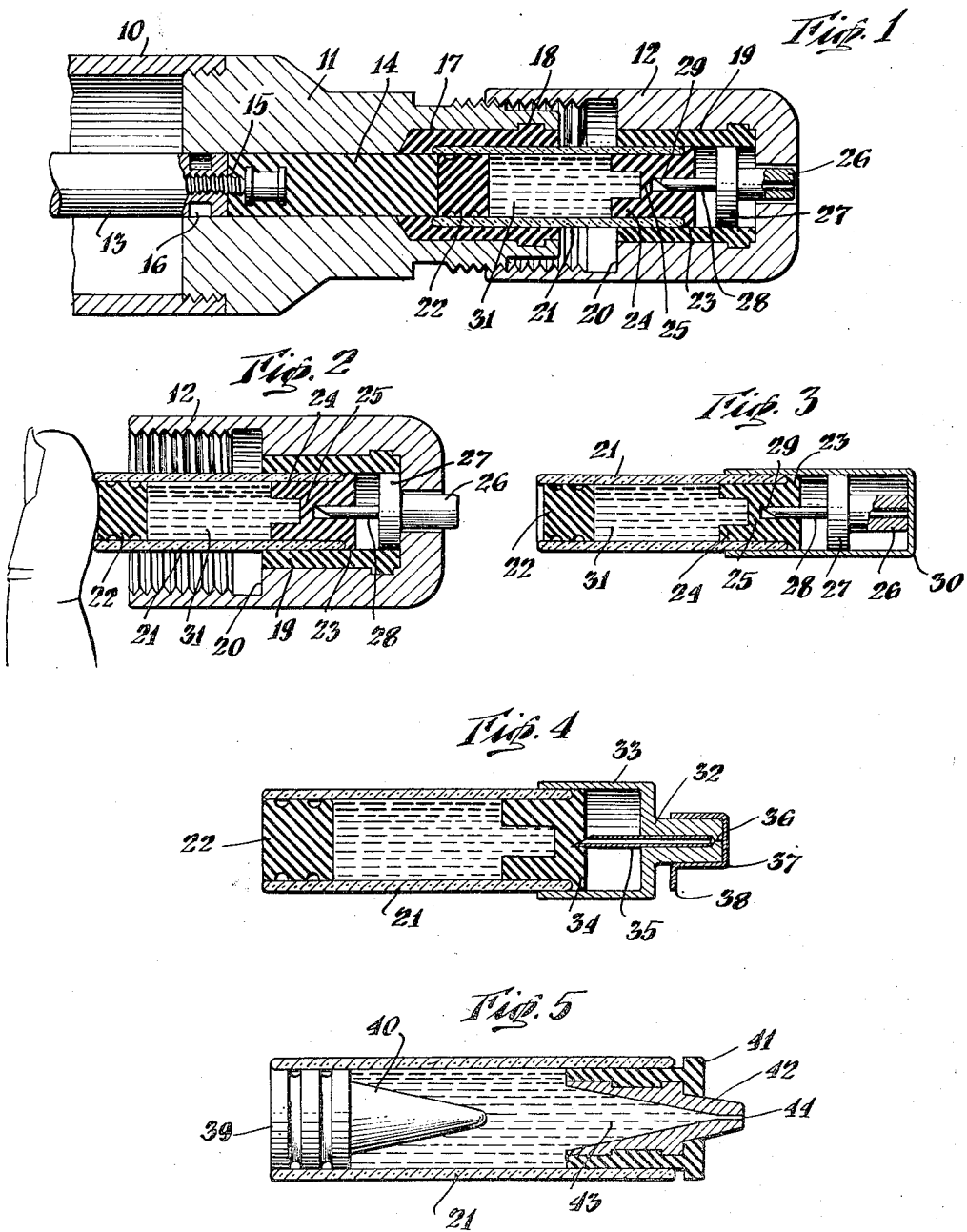
INVENTOR.
Fairleigh S. Dickinson, Jr.
BY
Duell and Kane
ATTORNEYS Patented Feb. 2, 1954

2,667,874

UNITED STATES PATENT OFFICE 2,667,874

MEDICAMENT CARTRIDGE ASSEMBLY

Fairleigh S. Dickinson, Jr., Ridgewood, N. J., assignor to Becton Dickinson and Company, Rutherford, N. J., a corporation of New Jersey Application July 9, 1951, Serial No. 235,728

3 Claims. (Cl. 128—272)

This invention relates to a medicament cartridge or ampule assembly and aims to provide a unit especially intended for use in connection with a velocity injection apparatus in which it is unnecessary to employ a skin-piercing needle.

It is an object of the invention to furnish a structure of simple and rugged design capable of manufacture according to quantity production methods; the parts of the assembly being conveniently discarded after the completion of a single hypodermic injection.

A further object is that of furnishing an assembly of this character which may contain a liquid medicament and will maintain the same free from contamination until the injection is to be made. The unit will be capable of ready association with the power apparatus by means of which the injection is performed. Thereafter the spent unit may be readily removed from that apparatus and be replaced by a fresh assembly.

With these and other objects in mind reference is had to the attached sheet of drawings illustrating practical embodiments of the invention and in which:

Fig. 1 is a fragmentary sectional side view of a power injection apparatus with an assembly in process of association therewith;

Fig. 2 is a similar sectional side view and showing the assembly being applied to a loading cap;

Fig. 3 shows the unit in its initial stage;

Fig. 4 is a sectional side view of an alternative form of structure; and

Fig. 5 is a similar view of a still further form of assembly.

Referring primarily to Fig. 1 in which one form of gun or pressure producing apparatus has been shown it will be seen that the reference numeral 10 indicates the exterior casing to the forward end of which a bored collar extension 11 is secured, as, for example, by screw threads. Similarly secured to the forward end of this collar is a loading cap 12. The threads connecting the latter to the collar may be relatively coarse or any equivalent structure is conveniently resorted to in order to provide a quick detachable form of coupling.

A power-actuated rod or piston assembly is projectible through the bore of the collar. This assembly may include a rod 13 of metal to which an extension of rubber or other suitable material 14 is secured as, for example, at 15. Conveniently one of these parts is formed with a groove 16 within which a suitable lubricant may be disposed. The rod 13 and parts secured thereto are shown in Fig. 1 in fully retracted or "cocked" position. When projected (which will entail movement to the right as viewed in Fig. 1), the forward end of the piston rod or extension 14 of the same will be projected throughout substantially the entire effective length of the medicament chamber.

Conveniently, and as shown, the bore of collar 11 is enlarged adjacent its forward end and receives a sleeve 17 preferably of rubber. Displacement of this sleeve with respect to the collar is conveniently prevented by an interlocking flange and groove structure 18. This sleeve extends to a point in line with the forward end of collar 11. The loading cap 12 is provided with a similar sleeve 19, the forward edge of which abuts the inner face of the end wall of that cap. The rear edge of sleeve 19 terminates in line with the transversely extending surface 20 which forms a part of the loading cap at a point intermediate its ends. When that loading cap is in fully seated position the adjacent ends or edges of sleeves 17 and 19 will abut. Finally, with respect to this power apparatus it will be observed that the outer or forward wall of cap 12 is provided with an opening through which a nozzle tip may extend.

Now considering the cartridge assembly one form of which has been shown in Fig. 3 prior to its application to the injection apparatus, it will be seen that the numeral 21 indicates an ampule tube preferably of glass, the rear end of which is closed by a piston type stopper 22 conveniently of rubber. The forward end of the tube is closed by a stopper embracing a head 23 and a plug portion 24. The latter may be formed with a recess in its end and which recess is aligned with a similar recess extending in the surface of head 23 and down into the body of the plug. The base portions of these recesses are spaced so that a pierceable partition 25 is furnished. A nozzle tip 26 preferably formed of metal is provided with a base portion 27 and with a bore within which a cannula 28 is positioned. The rear end of this cannula extends materially beyond the base 27 and is pointed as at 29. This cannula may project outwardly through to the outer face of nozzle 26 and define a bore which, at least adjacent its forward end, will be of restricted area. Such restriction is conveniently on the order of .005" to .013". The entire nozzle, head 23 of the stopper and forward end of the ampule tube 21 are enclosed by a cap 30. That cap is preferably formed of a plastic material such as polythene which will maintain the sterility of the parts.

In using a unit of this character the loading cap 12 is dismounted. The piston or rod 13 together with the extension 14 is retracted. Conveniently by means of a suitable tab portion (not shown) cap 30 may be stripped from the nozzle tip and adjacent parts. Sterility will be maintained in that cannula 28 will remain within the recess defined in the outer face of the forward cap. To this end it is apparent that cap 30 need not be removed until after the rear end of the cartridge assembly has been inserted into the bore defined by sleeve 17 with the outer face of stopper 22 bearing against the adjacent face of extension 14 or its equivalent. In any event with loading cap 12 now applied so that the nozzle tip is disposed at a point where it aligns with the opening in the outer wall of that cap then, as in Fig. 1, the cap may be tightened upon collar 11. With such tightening base portion 27 will be engaged by the inner face of the cap end wall. Continued tightening will cause point 29 to pierce portion 26. In the final stages of mounting the cap base 27 will move into contact with the outer face of head 23. The bore of the cannula being in communication with the body of medicament 31 within the cartridge it follows, that a small amount of medicament will actually appear upon the outer face of the nozzle tip during the final positioning of the parts. This will evidence that all air has been expelled.

If now the apparatus as in Fig. 1 is "fired" rod 13 and extension 14 will be projected. At this time it is to be noted that regardless of whether sleeve 17 is a single or multi-part unit, it extends to the rear of the ampule or cartridge. In other words it has its bore restricted to the size of the bore of collar 11 within which rod 13 moves. As such it furnishes a seat limiting the rearward movement of tube 21. Therefore, with extension 14 projecting against stopper 22 and encountering the resistance to rapid movement offered by that stopper, those portions of extension 14 which lie adjacent and in contact with the rearward part of sleeve 17 will exert pressure against that sleeve. This will be transmitted to sleeve 19. Therefore the bores of both sleeves will tend to constrict. This constriction will cause them to intimately contact the outer face of tube 21. Accordingly that tube will be supported against bursting despite high internal pressures. As is apparent after rod 13 is moved with a force of, for example, four thousand pounds to the square inch not alone will the foregoing result occur but also the medicament 31 will have pressure exerted on it such that it will move at high velocity through the bore of the cannula and be ejected therefrom in a stream such that the epidermis in contact with the nozzle tip will be pierced by the medicament. Accordingly the desired injection is achieved. Thereafter, by removing the loading cap 12 the spent assembly may be withdrawn and discarded and the entire cycle repeated.

As shown in Fig. 2 the loading technique heretofore described in connection with Fig. 1 need not necessarily be followed. In other words an operator may conveniently strip cap 30 from the forward end of the assembly. Thereafter, by grasping the rear end of the ampule, he may insert the nozzle tip and the forward ampule end into the bore of sleeve 19. Consequently base 27 will abut the inner face of the end wall of the cap. Continued pressure will cause the cannula to pierce the forward stopper. Thereupon a minim of medicament will discharge through the bore of the nozzle and appear upon its outer face. The cap 12 may now be applied to collar 11 and when the parts are tightened with the piston stopper 22 will be in contact with the extension of rod 13 and the rear edge of the ampule will engage the seat defined by sleeve 17.

As shown in Fig. 4 the nozzle tip 32 may be provided with a rearward extension 33. Also the forward cap 34 may be modified over the showing in Figs. 1 to 3. In any event this cap may be pierced by the cannula 35 carried by the nozzle tip. As also shown in Fig. 4 cannula 35 may embrace any desired diameter and merely the metal of tip 32 may define an outer orifice portion 36 of properly restricted diameter. A protecting cap 37 of plastic or other material will maintain the parts in sterile condition. For ease of removal a tab 38 may form a part of this cap.

When the device is to be used the cap is stripped from the nozzle tip. This may be done after the parts are positioned with the ampule tube 21 within the bore of sleeve 17. Otherwise the technique suggested in connection with Fig. 2 may be followed. In any event a telescoping force will be exerted on the part of the nozzle with respect to the tube 21. That force will result in a piercing of stopper 34 and a relative shifting of the latter to where it bears against the inner face of the tip. Under these circumstances medicament will expel all air from the bore of cannula 35.

Finally referring to Fig. 5 it will be seen that the reference numeral 21 again indicates the ampule or cartridge tube which is preferably formed of glass. This tube is provide at its rear end with a piston type stopper 39 which, contrary to the stopper 22, is furnished with a forwardly tapered portion conveniently in the form of a cone 40. The forward end of tube 21 is closed by a headed stopper 41. This stopper is provided with a bore within which a nozzle head 42 is mounted. Such mounting may be effected at the time of molding or otherwise. The nozzle 42 is furnished with a tapered recess 43 in its rear face and the configuration of which corresponds to that of projection 40. Recess 43 is continued in the form of a reduced diameter bore 44 terminating at the outer end of the nozzle. This bore provides the ejection orifice.

As shown stopper 41 may initially be slightly projected beyond the forward end of tube 21. While not illustrated the parts may be maintained against contamination by means of a suitable cover or cap as described in connection with the earlier figures. When the unit is ready for use and conveniently at the time of its application to the power apparatus or gun the sterile covering is removed. Either by the procedure heretofore outlined in connection with Figs. 1 and 2 or otherwise, stopper 41 is retracted within the bore of tube 21. This retraction will result in an expulsion of medicament through the orifice of nozzle 42. Accordingly an operator will be assured that no air is present which upon a firing of the device would otherwise be injected below the epidermis. As piston stopper 39 is projected the medicament will be discharged in the desired manner. Due to the interfitting surfaces of projection 40 and recess 43 a complete discharge of substantially all medicament is assured. Also, with the reduced areas present the injection pressure is maintained or increased even although the force of movement of rod 13 may diminish during the final stages of the stroke.

Thus, among others, the several objects of the invention as specifically aforenoted are achieved. Obviously numerous changes in construction and rearrangement of the parts might be resorted to without departing from the spirit of the invention as defined by the claims.

I claim:

1. A medicament cartridge assembly including in combination a tube, a piston stopper adjacent one end of the same, a second stopper fixedly disposed adjacent the opposite end of said tube, a nozzle carried by said latter stopper, said nozzle defining an orifice through which medicament within said tube may be discharged at high velocity upon said piston stopper being projected through said tube, a cannula having a forward end secured to said nozzle, the rear end of said cannula being movable through said fixed stopper to establish communication with the interior of said tube and the outer face of said nozzle defining a blunt end for contact with the surface of epidermis through which the medicament is to be injected.

2. A medicament cartridge assembly including in combination a tube, a piston stopper adjacent one end of the same, a second stopper fixedly disposed adjacent the opposite end of said tube, a nozzle carried by said latter stopper, said nozzle defining an orifice through which medicament within said tube may be discharged at high velocity upon said piston stopper being projected through said tube, a cannula having a forward end secured to said nozzle, the rear end of said cannula being disposed within the body of said fixed stopper and movable therethrough to establish communication with the interior of said tube and the outer face of said nozzle being blunt to be disposed in contact with the epidermis to be pierced by the medicament with said tube.

3. A medicament cartridge assembly including in combination a tube, a piston stopper adjacent one end of the same, a second stopper fixedly disposed adjacent the opposite end of said tube, a nozzle carried by said latter stopper, said nozzle defining an orifice through which medicament within said tube may be discharged at high velocity upon said piston stopper being projected through said tube, a cannula having a forward end secured to said nozzle, the outer face of said fixed stopper being formed with a recess, the rear end of said cannula extending into said recess and being supported by engagement with the surfaces thereof, such rear end being movable through said fixed stopper to establish communication with the interior of said tube and the outer face of said nozzle being blunt and adapted for engagement with the surface of the epidermis to be pierced by said medicament.

FAIRLEIGH S. DICKINSON, JR.

References Cited in the file of this patent

UNITED STATES PATENTS

| Number | Name | Date |
| --- | --- | --- |
| 1,817,003 | Hein | Aug. 4, 1931 |
| 1,867,355 | Fletcher | July 12, 1932 |
| 1,993,629 | Smith | Mar. 5, 1935 |
| 2,524,362 | Smith | Oct. 3, 1950 |